US012243072B2

(12) United States Patent
Muralidharan et al.

(10) Patent No.: US 12,243,072 B2
(45) Date of Patent: Mar. 4, 2025

(54) SEGMENT MODELING FOR MACHINE LEARNING USING TENSOR TRAIN DECOMPOSITIONS

(71) Applicant: Microsoft Technology Licensing, LLC, Redmond, WA (US)

(72) Inventors: Ajith Muralidharan, Sunnyvale, CA (US); Ankan Saha, San Francisco, CA (US); Prakruthi Prabhakar, Foster City, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 77 days.

(21) Appl. No.: 18/094,027

(22) Filed: Jan. 6, 2023

(65) Prior Publication Data

US 2024/0232939 A1   Jul. 11, 2024

(51) Int. Cl.
  *G06Q 30/02*   (2023.01)
  *G06N 3/08*   (2023.01)
  *G06Q 30/0242*   (2023.01)

(52) U.S. Cl.
  CPC ........... *G06Q 30/0246* (2013.01); *G06N 3/08* (2013.01)

(58) Field of Classification Search
  CPC .............................. G06Q 30/0246; G06N 3/08
  See application file for complete search history.

(56) References Cited

U.S. PATENT DOCUMENTS

| 10,558,923 | B1* | 2/2020 | Kenthapadi | G06N 7/01 |
| 2017/0076299 | A1* | 3/2017 | Modarresi | G06Q 30/0202 |
| 2020/0193327 | A1* | 6/2020 | Iwakura | G06F 16/2237 |
| 2022/0101093 | A1* | 3/2022 | Hildebrandt | G06N 3/042 |

OTHER PUBLICATIONS

"Tensorized Embedding Layers" (Oleksii Hrinchuk, Valentin Khrulkov, Leyla Mirvakhabova, Elena Orlova, and Ivan Oseledets. 2020. In Findings of the Association for Computational Linguistics: EMNLP 2020, pp. 4847-4860, Online. Association for Computational Linguistics) (Year: 2020).*

"A New Approach for Advertising CTR Prediction Based on Deep Neural Network via Attention Mechanism" (Wang, Qianqian, Liu, Fang'ai, Xing, Shuning, Zhao, Xiaohui, Computational and Mathematical Methods in Medicine, 2018, 8056541, https://doi.org/10.1155/2018/8056541) (Year: 2018).*

* cited by examiner

*Primary Examiner* — James M Detweiler

(74) *Attorney, Agent, or Firm* — Cantor Colburn LLP; Renee D Brown

(57) ABSTRACT

In an example embodiment, tensor train decompositions are used to create large, personalized layers that are efficient for segment modeling. More particularly, rather than performing learning on an input matrix of training data that contains all segments, and then crossing this matrix with a vector for a particular segment, the matrix is mapped to an N-dimensional tensor, where each of the dimensions corresponds to one of the properties used to compose the segment, which can then be approximated by tensor train decomposition to enable efficient training and scoring.

17 Claims, 7 Drawing Sheets

SEGMENT MODELING FOR MACHINE LEARNING USING TENSOR TRAIN DECOMPOSITIONS

TECHNICAL FIELD

The present disclosure generally relates to technical problems encountered in machine learning. More specifically, the present disclosure relates to segment modeling for machine learning using tensor train decompositions.

BACKGROUND

The rise of the Internet has occasioned two disparate yet related phenomena: the increase in the presence of online networks, such as social networking services, with their corresponding user profiles visible to large numbers of people, and the increase in the use of these online networking services to provide content. An example of such content is user profiles. Here, user profiles may include various attributes of a user, as input by that user. In the professional context, these user profiles are often used by users to provide viewers with their career qualifications (e.g., experience, education, etc.), essentially acting like online resumes.

Machine learning models can be used to make various predictions regarding such online content. One such prediction is a propensity to interact, also referred to as "click propensity," which is a measurement of one user's propensity to interact with (e.g., "click on") a piece of content (such as another user's profile). This prediction may then be used in determining whether to present the piece of content to the user and/or the mechanism or channel used to present the piece of content.

A technical issue that is encountered in such machine learning models is that the training data used to train such models is often obtained by using real-world data, such as prior users' interactions with data. Such training data, therefore, is often heavy with information from high-volume users (i.e., users who use the system a lot and/or interact with content a lot), making it difficult for such models to accurately predict propensity to interact for users who may be, or at least may be similar to, lower-volume users.

One solution is to build a model in which segments are defined to correspond to various combinations of features of users, such as how long the user has been a member of the service, activity level, geographical location, industry, job function, and so forth. More particularly, multi-task learning can be performed, with different tasks for each segment, to allow for optimization of the model for the various segments. Multi-task learning, however, does not scale effectively when the number of segments is large and composed from individual characteristics. Additionally, multi-task learning, and other naïve approaches, are typically only applied in the last layer, or at least the last few layers, of a neural network, which restricts the network structure so as to require that multi-task learning be performed at the end of the neural network and does not allow other portions of the neural network to be used for the multi-task learning.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
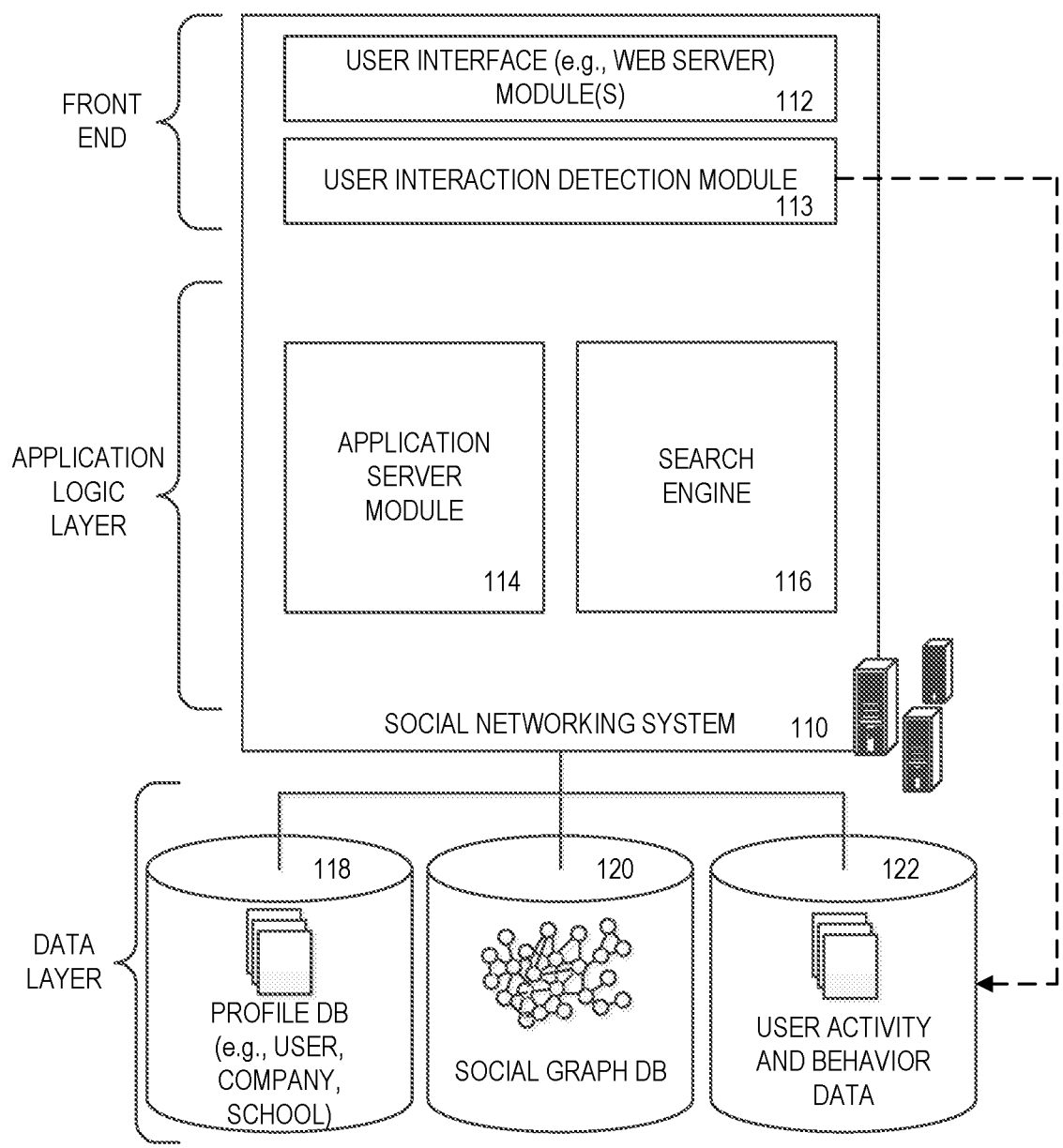
FIG. 1 is a block diagram showing the functional components of a social networking service, including a data processing module referred to herein as a search engine, for use in generating and providing search results for a search query, consistent with some embodiments of the present disclosure.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, tensor train decompositions are used to create large, personalized layers that are efficient for segment modeling. Tensor train decompositions are generalizations of singular value decompositions from matrices to tensors (multidimensional arrays). More particularly, rather than performing learning on an input matrix of training data that contains all segments, and then crossing this matrix with a vector for a particular segment, the matrix is mapped to an N-dimensional tensor, where each of the dimensions corresponds to one of the properties used to compose the segment, which can then be approximated by tensor train decomposition to enable efficient training and scoring.

More particularly, in a neural network, one of the most frequently used layers is a fully-connected layer. This layer comprises a linear transformation of a high-dimensional input signal to a high-dimensional output signal with a large dense matrix defining the transformation. In many deep neural networks, the dimensions of the input and output signals of the fully-connected layers are in the thousands, bringing the number of parameters of the fully-connected layers up to the millions.

In an example embodiment, a compact multi-linear format, called the tensor train format, is used to represent the dense weight matrix of the fully-connected layers using fewer parameters than traditional dense weight matrices of fully-connected layers while keeping enough flexibility to perform signal transformations. This can be implemented into a training algorithm for a propensity-to-interact model because all of the derivates used by back-propagation can be computed using the properties of the tensor train format.

The use of a tensor train in this context involves two parts. First, a matrix is converted to a tensor by creating a bijection, which maps each element of the matrix to an element in the tensor. This may be performed by, for example, by creating a separate bijection for rows as for columns. More particular, with respect specifically to segmentation, a specialized technique is provided to produce a bijection for a tensor train decomposition where a first dimension corresponds to the input vector and the next p−2 dimensions correspond to categorical variables (where p is the dimension of the tensor). Second, the elements of the matrix can be approximated from the final bijection.

This approximation of the matrix can be used in place of the ordinary fully-connected matrix for any training and/or evaluation operations, creating a tensor train modeling technique that compresses the neural network, making it significantly more scalable without a reduction in reliability, even for personalized segments.

DESCRIPTION

The disclosed embodiments provide a method, apparatus, and system for performing dynamic segment modeling in machine learning, and in some example embodiments, specifically performing segment modeling to determine how to display content impressions in a graphical user interface. It should be noted that for ease of understanding, a particular type of content, specifically job listings, will be described in detail in this disclosure. Nothing in this disclosure shall be read, however, as specifically limiting implementation of the techniques described herein to job listings, and the claims shall not be interpreted as being limited to job listings unless explicitly stated.

Segment modeling is used when it is desirable to personalize a machine learning model's performance at a segment level. The term "segment" is used in the broad sense and refers to any mechanism to separate the data along certain characteristics. For example, in an online service where user profiles are shared with other users and content items are also shared with users, a segment may reflect certain characteristics that are either user and item related or both. Thus, for example, segments can define different combinations of amount of user experience in the online service, amount of interaction of the user in the online service, geographic area, industry, job function, notification type, and so forth. As will be seen, in an example embodiment, segments can also be learned, and not specified before modeling, which can result in segments being defined along non-traditional boundaries. For example, while in the past the term "segment" may have implied that a specific value of a particular category is present in all data in the segment (e.g., the segment is user profiles where "software engineer" is the job function), or perhaps some combination of values of different categories are all present in all data in the segment (e.g., the segment is user profiles where "software engineer" is the job function and "Silicon Valley" is the geographic area), having the machine learning model learn segments allows for arbitrary divisions that may not be so strictly defined or separated.

Naïve approaches to segment modeling involve using techniques such as multi-task learning that is integrated into a final or near final layer of the neural network. For example, the neural network is constructed with one or more fully-connected layers, followed by a segmentation layer. The segmentation layer essentially learns parameters for the different segments. A multi-task learning layer then learns to optimize for all the outputs for all the different segments from the segmentation layer.

Multi-task learning, however, does not scale effectively when the number of segments is large and composed from individual characteristics. One reason for this is that each of the fully-connected layers is still trained and evaluated using an input matrix that contains data from all segments, and then this matrix is later crossed with a vector for the individual segments. The result is that the dimensionality of each fully-connected layer can be quite large as the number of different combinations of categories and values increases.

In an example embodiment, tensor train decompositions are used to create large, personalized layers that are efficient for segment modeling. More particularly, rather than performing learning on an input matrix of training data that contains all segments, and then crossing this matrix with a vector for a particular segment, the matrix is mapped to an N-dimensional tensor, where each of the dimensions corresponds to one of the properties used to compose the segment, which can then be approximated by tensor train decomposition to enable efficient training and scoring.

In an example embodiment, a compact multi-linear format, called the tensor train format, is used to represent the dense weight matrix of the fully-connected layers using few parameters while keeping enough flexibility to perform signal transformations. This can be implemented into a training algorithm for a propensity-to-interact model because all of the derivates used by back-propagation can be comported using the properties of the tensor train format.

In an example embodiment, a specialized technique is provided to produce a bijection for a tensor train decomposition of an original matrix where a first dimension corresponds to the input vector and the next p−2 dimensions correspond to categorical variables (where p is the dimension of the tensor). Categorical variables are variables whose values can take on one of a limited number of values, each of which corresponds to a particular group or nominal category on the basis of some qualitative property. This allows elements of the matrix to be approximated from the final bijection, without the need for the fully-connected layers to contain all the dimensions they would have if they were to take as input the original matrix.

FIG. 1 is a block diagram showing the functional components of a social networking service, including a data processing module referred to herein as a search engine, for use in generating and providing search results for a search query, consistent with some embodiments of the present disclosure.

As shown in FIG. 1, a front end may comprise a user interface module 112, which receives requests from various client computing devices and communicates appropriate responses to the requesting client devices. For example, the user interface module(s) 112 may receive requests in the form of Hypertext Transfer Protocol (HTTP) requests or other web-based API requests. In addition, a user interaction detection module 113 may be provided to detect various interactions that users have with different applications, services, and content presented. As shown in FIG. 1, upon detecting a particular interaction, the user interaction detection module 113 logs the interaction, including the type of interaction and any metadata relating to the interaction, in a user activity and behavior database 122.

An application logic layer may include one or more various application server modules 114, which, in conjunction with the user interface module(s) 112, generate various user interfaces (e.g., web pages) with data retrieved from various data sources in a data layer. In some embodiments, individual application server modules 114 are used to implement the functionality associated with various applications and/or services provided by the social networking service.

As shown in FIG. 1, the data layer may include several databases, such as a profile database 118 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 118. Similarly, when a representative of an organization initially registers the organization with the social networking service, the representative may be prompted to provide certain information about the organization. This information may be stored, for example, in the profile database 118 or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 120.

As users interact with the various applications, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 1, by the user activity and behavior database 122. This logged activity information may then be used by the search engine 116 to determine search results for a search query.

Although not shown, in some embodiments, the social networking system 110 provides an Application Program Interface (API) module via which applications and services can access various data and services provided or maintained by the social networking service. For example, using an API, an application may be able to request and/or receive one or more recommendations. Such applications may be browser-based applications or may be operating system-specific. In particular, some applications may reside and execute (at least partially) on one or more mobile devices (e.g., phone or tablet computing devices) with a mobile operating system. Furthermore, while in many cases the applications or services that leverage the API may be applications and services that are developed and maintained by the entity operating the social networking service, nothing other than data privacy concerns prevents the API from being provided to the public or to certain third parties under special arrangements, thereby making the navigation recommendations available to third-party applications and services.

Although the search engine 116 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 116 facilitates the indexing and searching for content within the social networking service, such as the indexing and searching for data or information contained in the data layer, such as profile data (stored, e.g., in the profile database 118), social graph data (stored, e.g., in the social graph database 120), and user activity and behavior data (stored, e.g., in the user activity and behavior database 122). The search engine 116 may collect, parse, and/or store data in an index or other similar structure to facilitate the identification and retrieval of information in response to received queries for information. This may include, but is not limited to, forward search indexes, inverted indexes, N-gram indexes, and so on.

Figure 2:
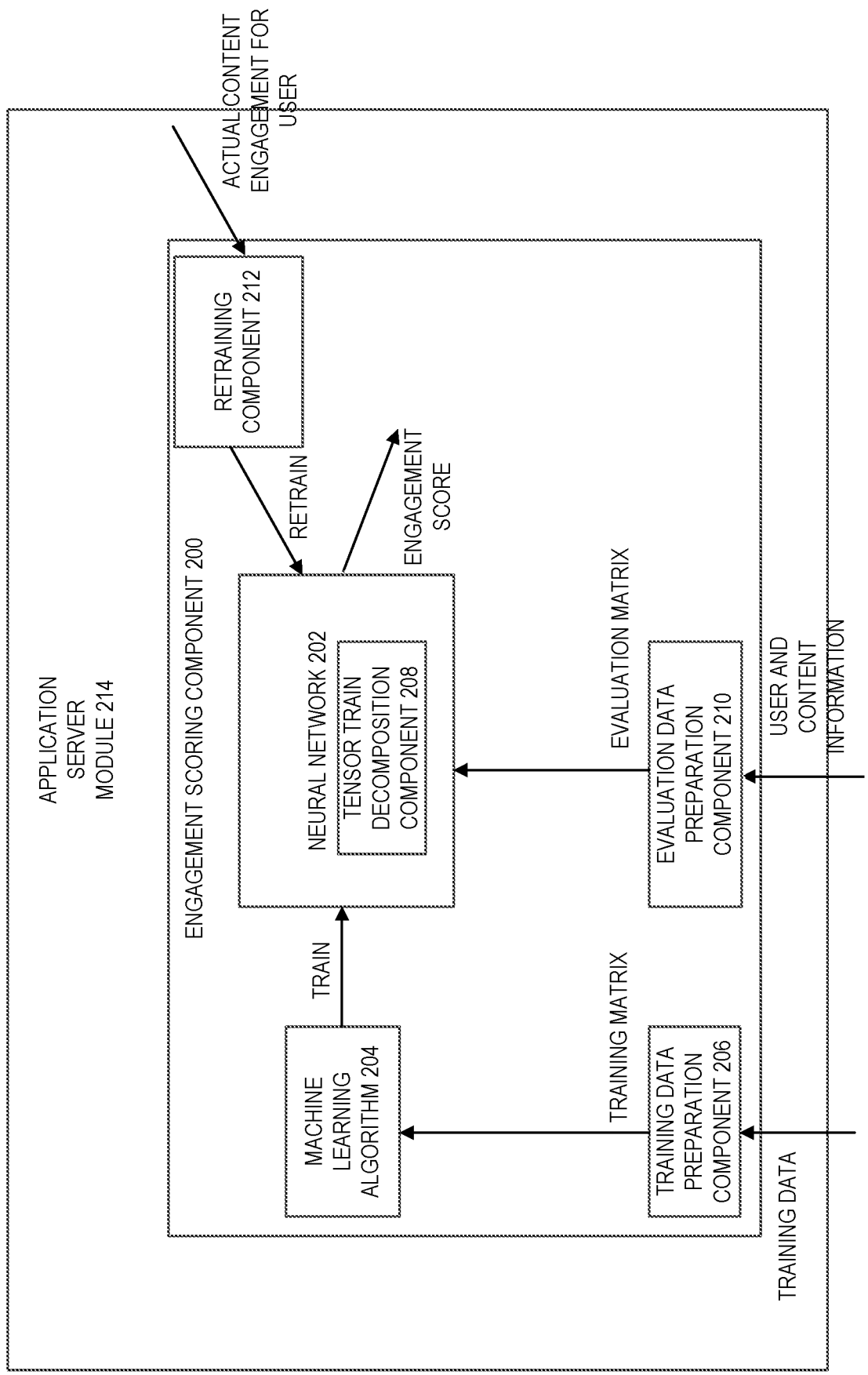
FIG. 2 is a block diagram illustrating an application server module of FIG. 1 in more detail, in accordance with an example embodiment.

FIG. 2 is a block diagram illustrating application server module 114 of FIG. 1 in more detail, in accordance with an example embodiment. While in many embodiments the application server module 114 will contain many subcomponents used to perform various different actions within the social networking system 110, in FIG. 1, only those components that are relevant to the present disclosure are depicted.

An engagement scoring component 200 acts to score content items based on a predicted engagement of user, and more particularly acts to obtain an engagement score, for a particular content item/user combination, which is a likelihood that the particular user will engage with (e.g., click on) the content item if presented with it.

The engagement scoring component 200 contains a neural network 202 trained by a machine learning algorithm 204. A training data preparation component 206 obtains data from one or more databases and performs one or more transformations on the data in order to prepare training data for use in training. These databases may include, for example, profile database 118, social graph database 120, and/or user activity and behavior database 122, among others, such as a jobs database (not pictured).

The transformations may include, for example, the computation of various metrics or scores based on the raw data from the databases. The result is a set of transformed training data. In an example embodiment, the transformed training data may include user attributes (such as location, skills, levels of skills, etc.), overall online network engagement across multiple users (such as home page views, unique users etc.), content engagement (such as home page views, user profile views, feed item views, etc), and so on. Some of this training data may be limited to certain time windows. For example, the engagement may be limited to only engagements performed within the last four weeks. The output of the training data preparation component 206 is a vector of data, including, for example, user data (with user features/categories), item data (with item features/categories), and information regarding their interactions (e.g., engagements of the users with the items).

Rather than use this training vector alone for the training of each fully-connected layer in the the neural network, a tensor train decomposition component 208 is used within one or more of the fully-connected layers to transform a matrix associated with the corresponding fully-connected layer to a tensor with fewer dimensions. The training input data is thus passed into a neural network, which consists of fully connected layers. Instead of representing the fully connected layers by dense matrices, tensor train networks can be used. This feature can be applied within any layer of the neural network. Bijections are used during this process, which help each sample only update a small subset of the parameters in the tensor train network. This allows the machine learning algorithm 204 to train fully connected layers in the neural network in a way that the fully connected layers have smaller dimensionality than traditional fully connected layers, resulting in a compact neural network 202 in relation to the size of the neural network 202 had it been trained directly using the training matrix output from the training data preparation component 206.

At evaluation time, user and content information may be passed to an evaluation data preparation component 210, which transforms the user and content information into an evaluation vector for scoring. Again, rather than use this evaluation vector alone, the tensor train decomposition component 208 transforms the evaluation vector based on the segment of the evaluation vector, using the trained tensor train fully-connected layer(s)

It should be noted that the evaluation data preparation component 210 and the use of the tensor train decomposition component 208 during evaluation can take place in either an online mode, an offline mode, or some combination thereof. In an online mode, a particular user who is being considered for display of a particular item will have their user information gathered along with the particular item's information and fed to the evaluation data preparation component 210, which prepares the evaluation vector in real-time. Alternatively, in an offline mode, various user/item combinations will have their information proactively gathered and formed into an evaluation vector and fed to the tensor train decomposition component 208 to allow for offline scoring. Alternatively, a combination of offline and online modes may be used where some information is prepared offline and some online.

The output of the neural network 202 is, at evaluation time, the engagement score for the user and content information passed at evaluation time. This engagement score may then be used by another component to make a decision relevant to the online network, such as by a content item ranking component (not pictured) that ranks content items being considered for display to a particular user, and subsequently by a presentation component (not pictured) to present appropriate content items to the user (such as through feed notifications, display on a search results page, or direct communication such as via email).

A retraining component 212 may then, at a later time, retrain the neural network 202. This retraining may be based on additional or new training data being received and/or may be based on analysis of the performance of the neural network 202, as expressed by usage data for users who have had content presented to them due to the results of the neural network 202. In the latter case, for example, if a user was displayed a particular content item due to the neural network predicting a high likelihood of engagement of that user with that content item, and the user ultimately does not engage with the content item, or otherwise signals a negative association with the content item, this information may be used as negative feedback by the retraining component 212, which may then change the neural network 202 to attempt to provide more accurate predictions in the future for the user or users like that user.

For the following equations, the following definitions are used. $\overline{A}$ is a generic matrix of dimensionality M×N, where M is the number of rows of the matrix and N is the number of columns of the matrix. This matrix could correspond to the weight matrix of the first layer of a deep neural network. Hence, M would signify the input dimensionality of the feature vector and N would signify the dimensionality of the output learnt segmented feature representation. That is, if $\vec{d}_{extended}$ is the input to the segmentation layer, $\overline{A}\vec{d}_{extended}$ would be the output.

A is a p-dimensional tensor of dimensionality $k_1 \times k_2 \ldots \times k_p$, with $k_1 \times k_2 \ldots \times k_p = M \times N$. $\overline{A}$ is converted to A using tensor train decomposition as described above to obtain a compressed and meaningful segmented feature representation easily for any given input. That is, instead of using $\overline{A}\vec{d}_{extended}$, $A\vec{d}_{extended}$, is used. In this conversion, every element of $\overline{A}$ can be mapped to a corresponding element in A.

g and h correspond to the row and column bijections as described above. In other words, g provides a one-to-one mapping between the set of indices [1, M] and [1, $m_1$]×[1, $m_2$] . . . ×[1, $m_p$] and h provides a one-to-one mapping between the set of indices [1, N] and [1, $n_1$]×[1, $n_2$]× . . . [1, np], with $$m_1 \times m_2 \ldots \times m_p = M \text{ and } n_1 \times n_2 \ldots \times n_p = N.$$

$G_i$ from i=1, . . . , p corresponds to the tensor cores. That is, every element of the tensor A can be written as a product of elements of the core matrices as $A(j_1, j_2, \ldots j_{pn})=G_1[j_1] G_2[j_2] \ldots G_n[j_{np}]$. $r_i$ corresponds to the TT-ranks of the tensor cores. That is, $r_i$ are used to represent dimensionality of the individual cores $$G_i \text{ as } G_1 \in R^{1 \times r_1}, G_k \in R^{r_{k-1} \times r_k} \text{ and } G_n \in R^{r_{n-1} \times 1 \times n}.$$

p is also related to the number of categorical variables used to define the segments.

Tensor networks help approximate large matrices. In general, their use involves two parts.

(a) Converting a matrix $\overline{A} \in R^{M \times N}$ to a p-d tensor $A \in R^{k_1 \times k_2 \ldots \times k_p}$, where $k_1 \times k_2 \ldots \times k_p = M \times N$ (as this will ensure that each element can be represented correctly).

This involves creating a bijection, which maps each element of the matrix $\overline{A}$ to an element in the tensor. One way to generate the bijection is to create multiple bijections, specifically a separate bijection for row and columns.

Row bijection:

$$g: [1, M] \to [1, m_1] X [1, m_2] \ldots X [1, m_p]$$

Column bijection:

$$h: [1, N] \to [1, n_1] X [1, n_2] X \ldots [1, n_p]$$

Where $n_1 \times n_2 \ldots \times n_p = N$ and $m_1 \times m_2 \ldots \times m_p = M$ Where the final bijection is $$f: [1, M] X [1, N] \to [1, k_1] X [1, k_2] X \ldots [1, k_p]$$

Where each dimension $l \in 1 \ldots p$ $k_1 = m_l \times n_l$ by composing the row and column bijections (b) Approximating the elements of the n-d matrix as $$A(j_1, j_2, \ldots j_n) = G_1[j_1] G_2[j_2] \ldots G_n[j_n]$$

Where $G_1 \in R^{1 \times r_1}$, $G_k \in R^{r_{k-1} \times r_k}$ and $G_n \in R^{r_{n-1} \times 1_n}$. $G_1[j_1]$ means that a different matrix is chosen for a different index j Typically, without any special information, all $r_i$ may be fixed to be the same value.

Consider an input feature set, which is a dense vector $\vec{d}$ with a shape ×1. For each member/item, consider p−2 categorical features, $f_1 \ldots f_{p-2}$ each with $d_1 \ldots d_{p-2}$ individual values respectively. Crossing these p−2 categorical variables with the dense vector $\vec{d}$ will create a vector $\vec{d}_{extended}$ of dimensions $\underline{d} \times d_1 \times \ldots d_{p-2} = M$. Slayer $\overline{A}$ is introduced that consumes this input vector, and outputs a N dimension variable (N can be 1 if the output is fed to a sigmoid function).

One way to approximate the matrix behind the layer (which is of dimension M×N) is to use the following bijection definition for a tensor train decomposition.

$$g: [1, M] \to [1, m_1] X [1, m_2] \ldots X [1, m_p]$$

Where the first dimension corresponds to the input vector of shape $m_1 = \overline{d}$ and the next p−2 dimensions correspond to the categorical variables, i.e., $m_k = d_{k-1}$ for $k = 2 \ldots p-1$ and $m_p = 1$. The following definition is also used $$h: [1, N] \to [1, n_1] X [1, n_2] X \ldots [1, n_p]$$

Where the first p−1 dimensions are always 1, $n_k = 1$ for $k = 1 \ldots p-1$ while $n_p = N$, i.e., all column indices map to the last item.

For modeling purposes, the matrix vector product of the $\overline{A} \vec{d}_{extended}$ is computed, which will be the output of this layer.

The definition above is special because it leads to efficiency in matrix vector multiplications, as well as implementation under one special consideration: each segment categorical feature for a particular data point is unique. Particularly, this means that the $$\overline{A}\vec{d}_{extended} = \overline{G}_1 \, G_2[j_2] \ldots G_{n-1}[j_{n-2}] \overline{G}_n \, \vec{d}$$

Where $\overline{G}_1$ is a $\overline{d} \times r$ dimension matrix, which contains all the $G_1[j_1]$ (1×r)vectors stacked vertically, and $G_n$ is a r×N dimension matrix and the indices $j_2 \ldots j_{n-2}$ are unique.

Implementation wise, what this means is that segments are used to pick different matrices $G_2[j_2]$ and then a standard matrix vector multiplication product is executed to obtain an approximation of the matrix that can be used by a compact neural network.

The segment model choices above provide a good expressive global model, which allows for hierarchical generalization. For example, consider the following segments—general level of engagement, geographic location, and industry. From a learning standpoint, all data points corresponding to the same geographic location, irrespective of other segments, will contribute to optimizing the $G_l[j_l]$ matrix. This could lead to some hierarchical generalization and elevate the global model quality.

From a fine-tuning standpoint, this structure of the neural network is also very efficient since it only needs to fine tune very few of the $G_l[j_l]$ matrices.

Tensor train layers can be used at any layer of the neural network, but in some example embodiments it may be beneficial to use a tensor train n the final layer while keeping other layers as is. For a given model, the final layer can be easily replaced by this layer, which takes in special side inputs (segment) information.

Figure 3:
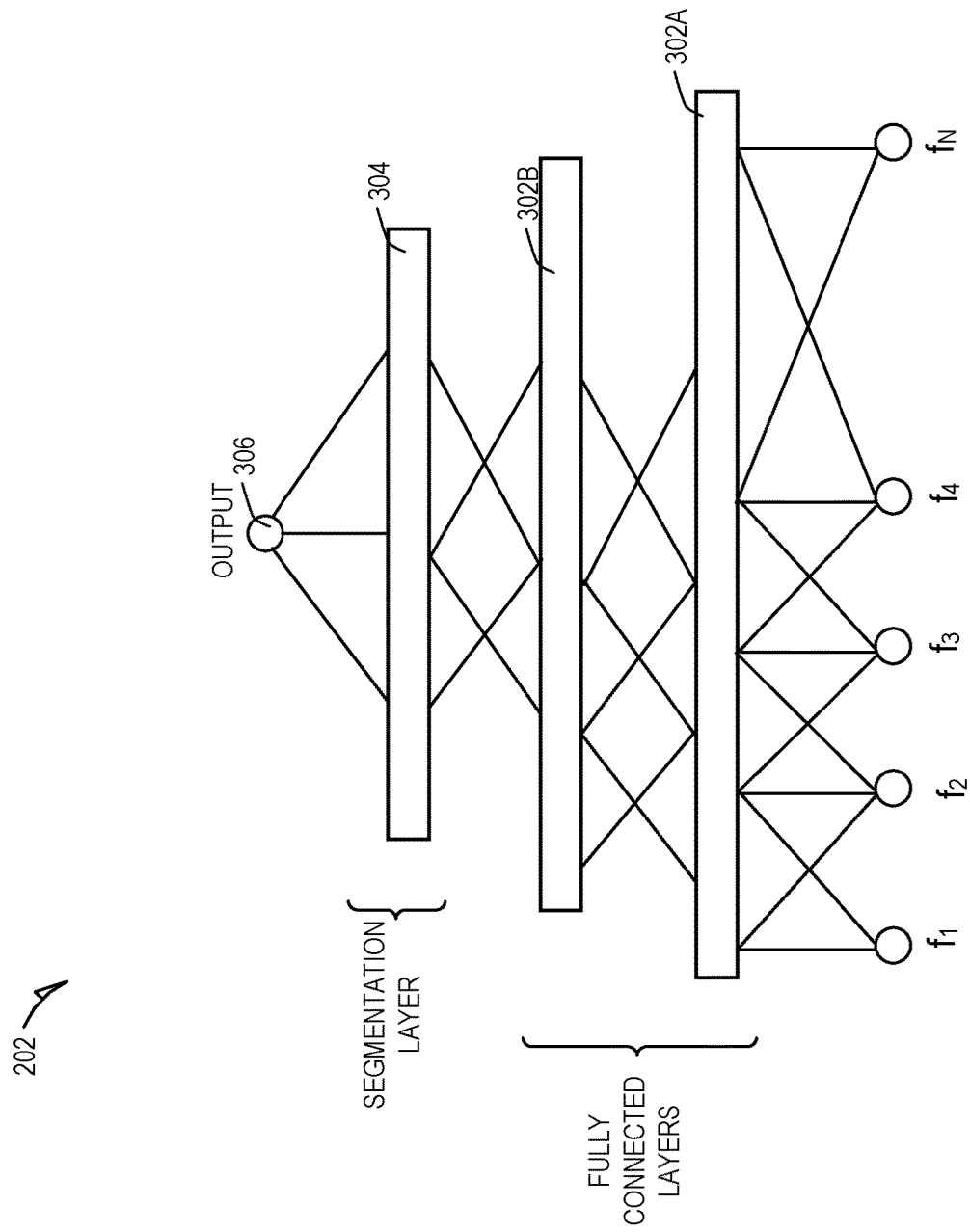
FIG. 3 is a block diagram illustrating a neural network, in accordance with an example embodiment.

FIG. 3 is a block diagram illustrating a neural network 202, in accordance with an example embodiment. Here the neural network may be a deep neural network. The neural network 202 may comprise a plurality of fully connected layers 302A-302B. Fully connected layers 302A-302B connect every neuron in one layer to every neuron in an adjacent layer. Input to fully connected layer 302A may be a subset or full set of feature representations of the data, potentially containing the segment features as well. The feature representations are ones that may be relevant to some sort of output prediction 306. For example, the output prediction 306 may be a likelihood that a particular user will engage with a particular content item (i.e., propensity to click). The features in such an example might include user features, such as those gathered from the user's profile and usage history, and item features, such as those gathered by data and metadata about the content item (e.g., text of the content item, type of the content item, etc.). The fully connected layers 302A-302B may progressively refine the features in that the features used by fully connected layer 302B may only be a subset of the features used by fully connected layer 302A.

A segmentation layer 304 may learn segments for the data based on the output of the fully connected layer 302B.

connected layer 302A to essentially retrain itself while the remainder of neural network 202 is being trained.

The following pseudocode may be used for an implementation using tensor train decomposition for segment modelling:

```
import tensorflow as tf
class TensorTrainLayer(tf.keras.layers.Layer):
    def __init__(self, num_outputs, core_names_list, core_dimensions, core_r):
        super(TensorTrainLayer, self).__init__( )
        self.num_outputs = num_outputs
        self.core_names_list = core_names_list
        self.core_dimensions = core_dimensions
        self.core_r = core_r
        self.total_params = None
    def build(self, input_shape):
        self.total_params = 0
        self.cores = [ ]
        for i in range(len(self.core_dimensions)):
            t_shape = [self.core_dimensions[i], input_shape['x'][-1] if i==0 else self.core_r, self.core_r]
            weights = self.add_weight("core_" + str(i), shape=t_shape, initializer=tf.keras.initializers.GlorotUniform)
            self.cores.append((self.core_names_list[i], weights))
            self.total_params += t_shape[0] * t_shape[1] * t_shape[2]
        self.first_core = self.cores[0][1] #TODO remove
        self.final_layer = self.add_weight("final_layer", shape=[self.core_r, self.num_outputs], initializer=tf.keras.initializers.GlorotUniform)
        self.total_params += self.core_r * self.num_outputs
        d_core_dim = [float(a) for a in self.core_dimensions]
        self.original_total_params = input_shape['x'][-1] * self.num_outputs * tf.reduce_prod(d_core_dim)
    @tf.function
    def call_test(self, inputs):
        # Expand dimensions so that core mat mul works correctly
        x = tf.expand_dims(inputs["x"], axis=1)
        my_core_slice = tf.gather(self.first_core, tf.ones([1024], dtype=tf.int32))
        x = tf.linalg.matmul(x, my_core_slice)
        x = tf.squeeze(tf.linalg.matmul(x, self.final_layer))
        return x
    @tf.function
    def call(self, inputs):
        # Expand dimensions so that core mat mul works correctly
        x = tf.expand_dims(inputs["x"], axis=1)
        for core_name, core in self.cores:
            # Gather my slice
            # my_core_slice = tf.gather(core, tf.ones([1024], dtype=tf.int32))
            my_core_slice = tf.gather(core, inputs[core_name])
            # print(core_name, x, my_core_slice)
            x = tf.linalg.matmul(x, my_core_slice)
        x = tf.squeeze(tf.linalg.matmul(x, self.final_layer))
        return x
    def print_usage_summary(self):
        if self.total_params:
            print("Original parameter size", self.original_total_params)
            print("New parameter size", self.total_params)
```

It should be noted that there may be other layers in the neural network 202 that are not pictured, such as input and output layers, convolutional layers (which apply a convolutional operation to the input), pooling layers (which combine the outputs of neuron clusters at one layer into a single neuron in the next layer), and normalization layers. Convolutional layers, pooling layers, fully connected layers, and normalization layers are known collectively as hidden layers. It should also be noted that there may be any number of fully connected layers, and embodiments are thus not limited to the two depicted here.

Figure 4:
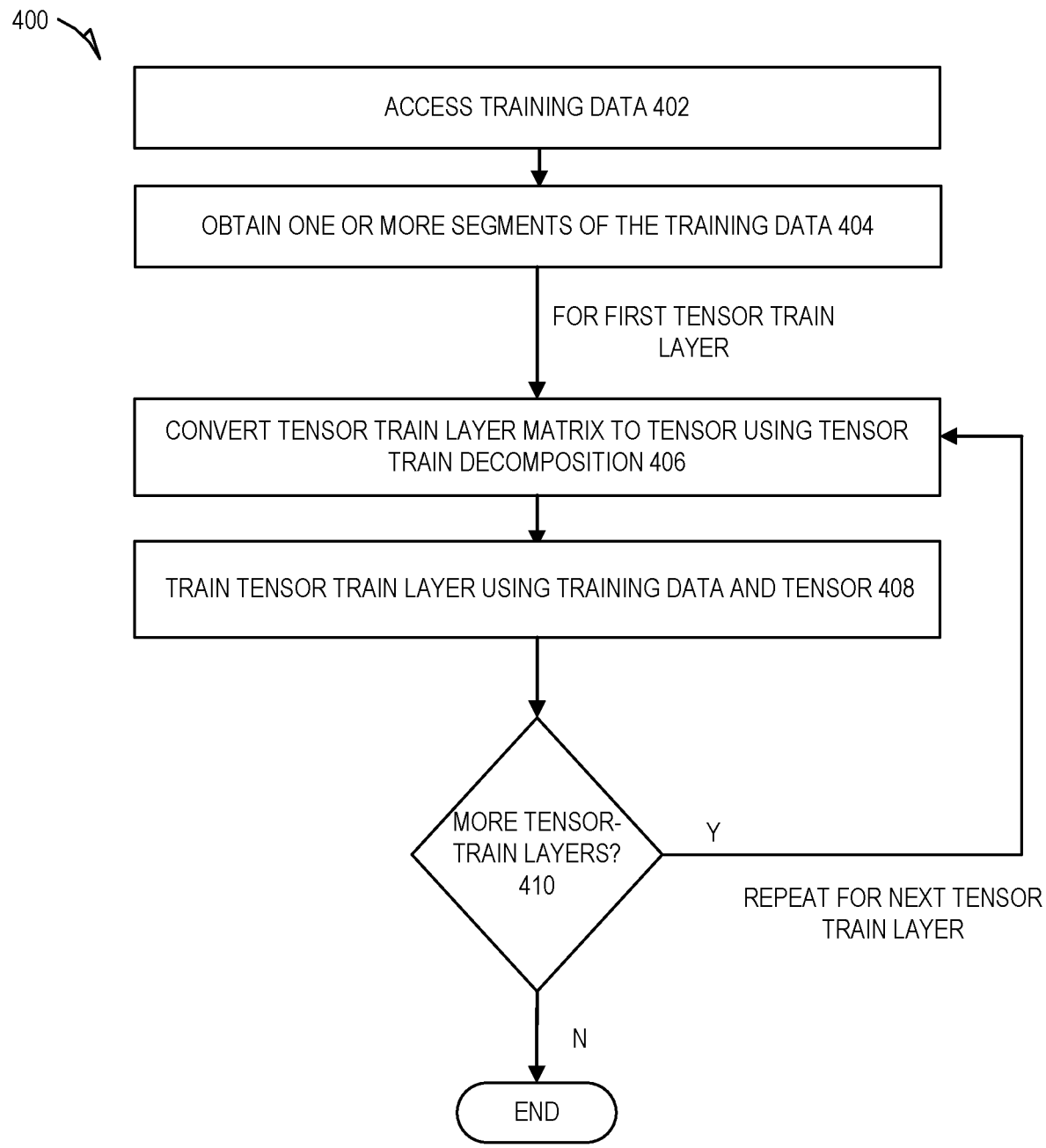
FIG. 4 is a flow diagram illustrating a method of training a neural network, in accordance with an example embodiment.

Furthermore, back propagation is used in the neural network 202. This means that parameters learned at each layer are not just passed to subsequent layers but also passed back up to prior layers. Thus, for example, fully connected layer 302B passes parameters not just to segmentation layer 304 but also to fully connected layer 302A, allowing fully FIG. 4 is a flow diagram illustrating a method 400 of training a neural network, in accordance with an example embodiment. At operation 402, training data comprising information about one or more users of an online network and one or more content items of the online network is accessed. In some example embodiments, the training data further comprises data about which users in the training data interacted with which items in the training data.

At operation 404, one or more segments of the training data are obtained. This may be obtained by, for example, receiving an identification of the segments of particular training data when the training data is accessed. Each segment defines a division of data along some grouping or combination of one or more characteristics, such as user experience level, geographic area, industry, job function, etc. Thus, for example, one segment may be defined as computer programmers with at least 2 years experience in the San Francisco Bay Area, while another segment may be defined as computer programmers with at least 2 years experience in the New York Metropolitan area.

Essentially the segment can be defined as a set of one or more common characteristics of data within the segment.

A loop is then begun for each of one or more tensor train layer in the neural network. A tensor train layer is a fully-connected layer that uses tensor train decomposition. At operation 406, a matrix associated with the corresponding tensor train layer is converted to a tensor using tensor train decomposition. Each of a plurality of dimensions of the tensor corresponds to a property used to define a different segment of the training data. The converting may include crossing one or more categorical variables in the training data with the training data to output a dense vector and passing the dense vector in a layer of the neural network designed to approximate the matrix using a bijection. Then, at operation 408, the corresponding tensor train layer is trained using the training data and the tensor. In some example embodiments, this involves multiplying a vector representing the training data by the tensor.

At operation 410, it is determined if there are any more tensor-train layers. If so, then the method 400 repeats to operation 406 for the next tensor train layer. If not, then the method 400 ends.

Figure 5:
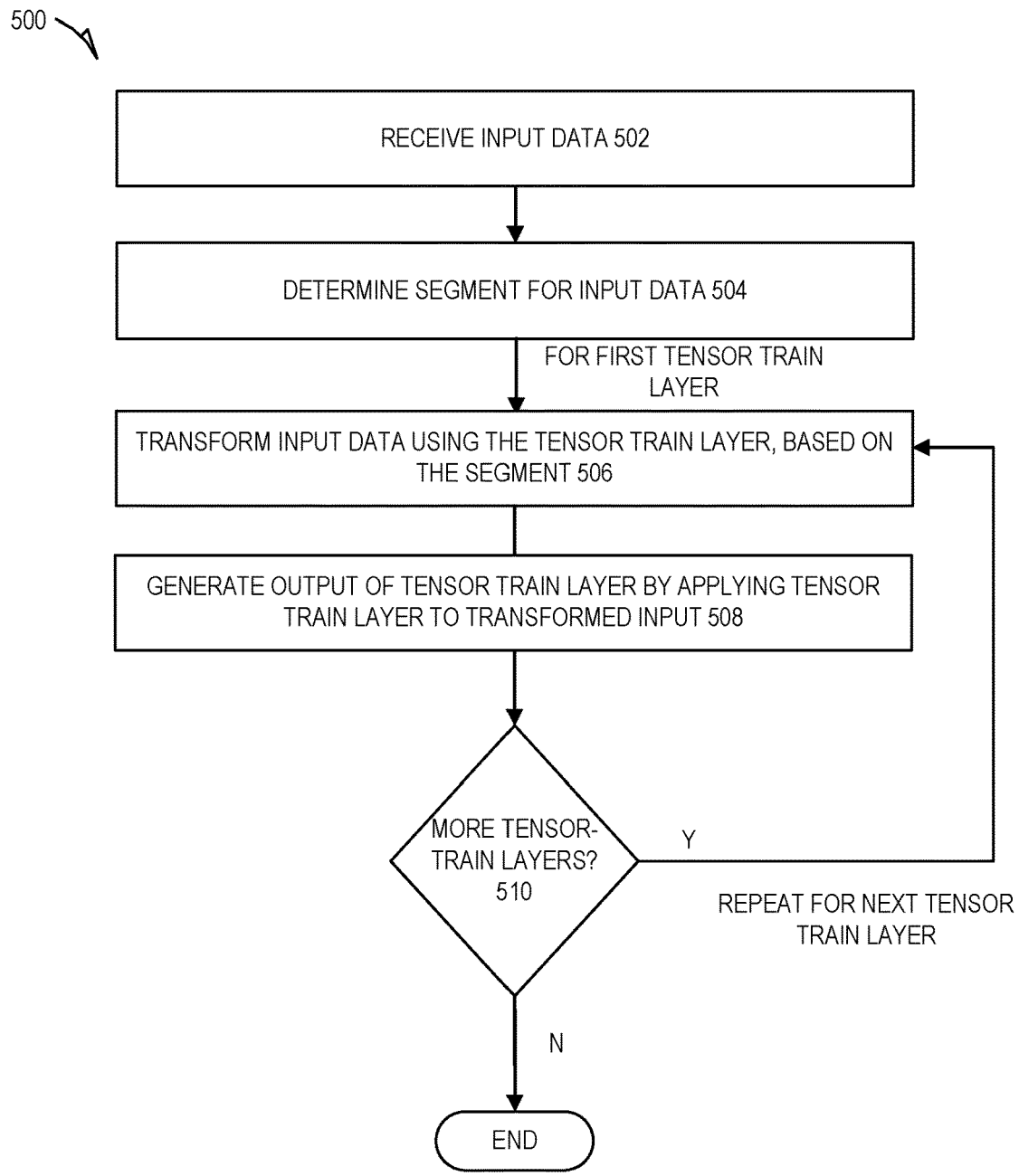
FIG. 5 is a flow diagram illustrating a method of evaluating input data using a trained neural network, in accordance with an example embodiment.

FIG. 5 is a flow diagram illustrating a method 500 of evaluating input data using a trained neural network, in accordance with an example embodiment. At operation 502, the input data is accessed. The input data may include, for example, information about a particular user and a particular content item being considered for display to the particular user in a user interface of an online network. At operation 504, a segment for the input data is determined. This may be performed in a number of ways. In one example embodiment, the input data is labelled with the segment, and thus the determination involves recognizing that label. In other example embodiments, a separate machine learning model may be used to predict the segment.

A loop is then begun for each of one or more tensor train layers in the neural network. At operation 506, the input data is transformed using the tensor train layer, based on the segment. At operation 508, output of the tensor train data is generated by applying the tensor train layer to the transformed input.

At operation 510, it is determined if there are any more tensor-train layers. If so, then the method 500 repeats to operation 506 for the next tensor train layer. If not, then the method 500 ends.

Figure 6:
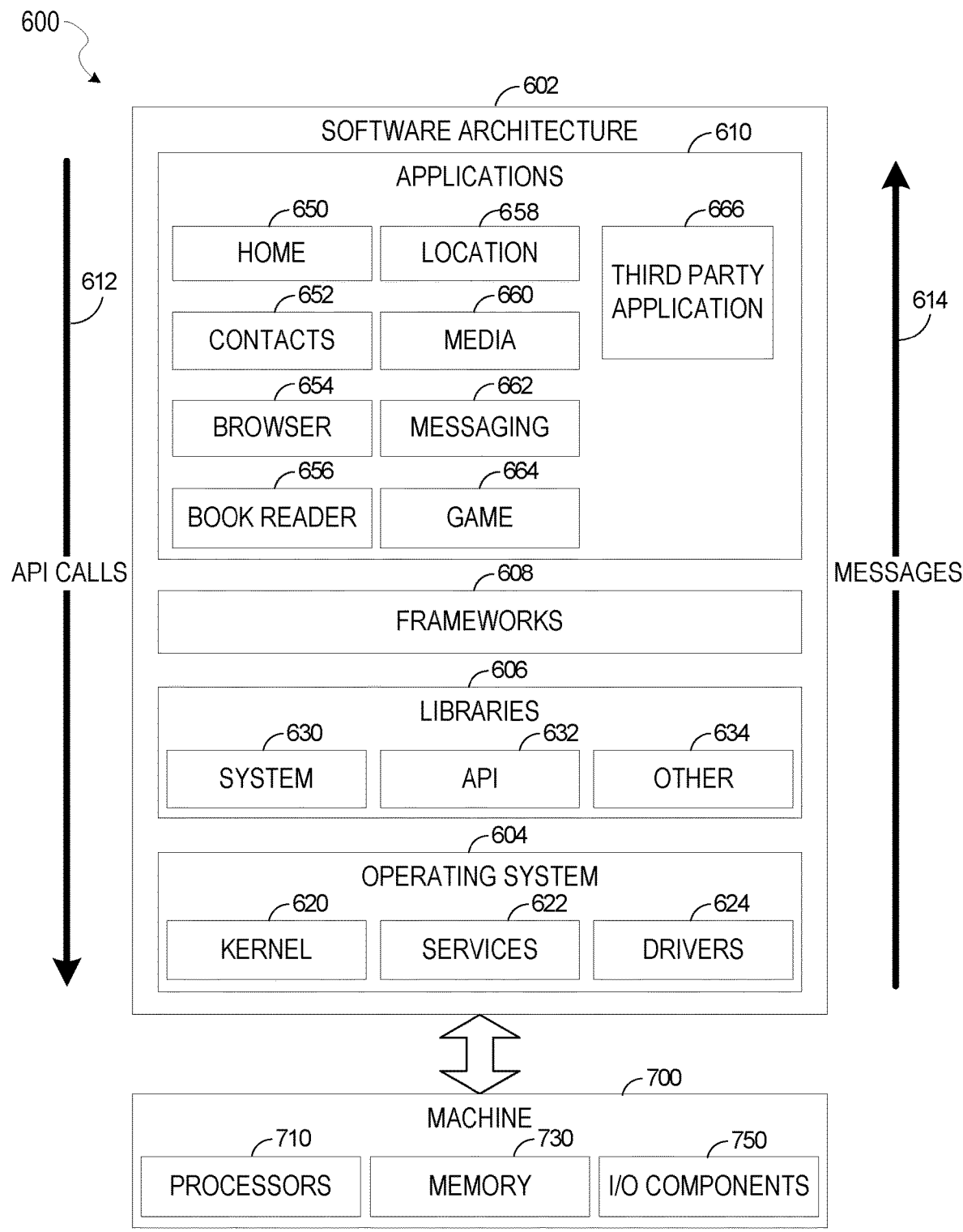
FIG. 6 is a block diagram illustrating a software architecture, in accordance with an example embodiment.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
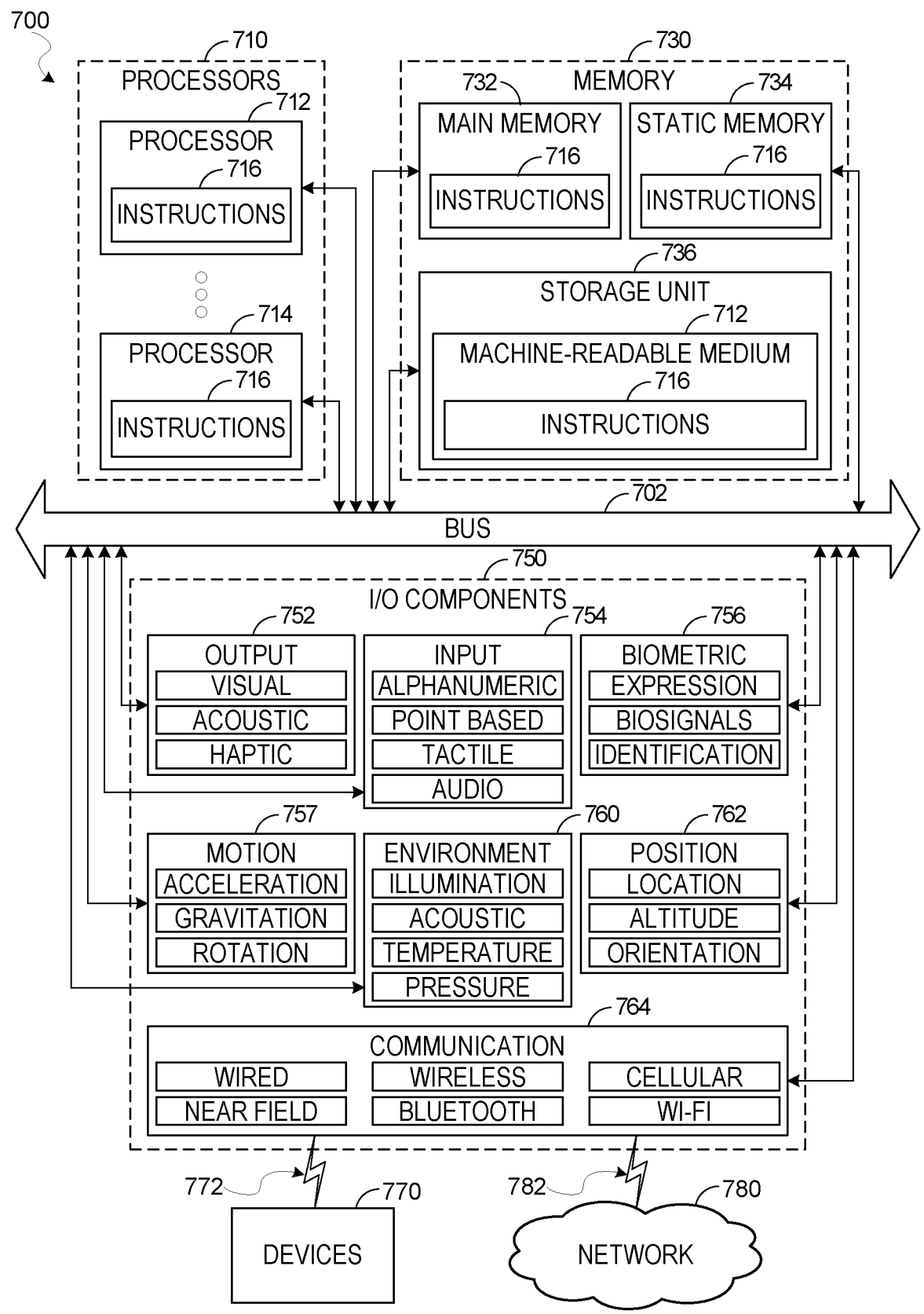
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein may be executed. For example, the instructions 716 may cause the machine 700 to execute the method 500 of FIG. 5. Additionally, or alternatively, the instructions 716 may implement FIGS. 1-5, and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors 712 (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor), multiple processors 710 with a single core, multiple processors 710 with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine 700 will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 790 via a coupling 782 and a coupling 792, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 790 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to the processors 710. Specific examples of machine-storage media, computer-storage media, and/or device-storage media include non-volatile memory devices, including, by way of example, semiconductor memory devices, e.g., erasable programmable read-only memory (EPROM), electrically erasable programmable read-only memory (EE-PROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 792 (e.g., a peer-to-peer coupling) to the devices 790. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
a computer-readable medium having instructions stored thereon, which, when executed by a processor, cause the system to perform operations comprising:
accessing training data comprising information about one or more users of an online network and one or more content items of the online network;
obtaining one or more segments of the training data, wherein the one or more segments are each a set of one or more common characteristics of the training data; and
training a neural network by feeding the training data into the neural network, the neural network containing a plurality of fully-connected layers, one of the fully-connected layers being a tensor train layer designed to convert a matrix associated with the at least one of the fully connected layers into a tensor using tensor train decomposition, each of a plurality of dimensions of the tensor corresponding to a respective property used to define a different segment of the training data, the tensor train layer comprising a last layer in the neural network that receives a side input comprising segment information for the one or more segments.

2. The system of claim 1, wherein the operations further comprise:
accessing input data;
determining a segment associated with the input data, wherein the segment associated with the input data is a set of one or more common characteristics of the input data;
transforming the input data using one or more tensor train layers, based on the segment associated with the input data; and
generating output by applying the one or more tensor train layers to the transformed input data.

3. The system of claim 2, wherein the training includes training the neural network to predict a likelihood that a user associated with the input data will interact with a content item associated with the input data if the user is presented with the content item in a user interface of the online network.

4. The system of claim 3, wherein the likelihood that the user associated with the input data will interact is a likelihood that the user associated with the input data will click on the content item if the user is presented with the content item in the user interface of the online network.

5. The system of claim 1, wherein the converting the matrix includes:
crossing one or more categorical variables in the training data with the
training data to output a dense vector; and
passing the dense vector in a tensor train layer of the neural network designed to approximate the matrix using a bijection.

6. The system of claim 1, wherein the training data further comprises data about interactions of users with content items.

7. A computerized method comprising:
accessing training data comprising information about one or more users of an online network and one or more content items of the online network;
obtaining one or more segments of the training data, wherein the one or more segments are each a set of one or more common characteristics of the training data; and
training a neural network by feeding the training data into the neural network, the neural network containing a plurality of fully-connected layers, at least one of the fully-connected layers being a tensor train layer designed to convert a matrix associated with the at least one of the fully connected layers into a tensor using tensor train decomposition, each of a plurality of dimensions of the tensor corresponding to a respective property used to define a different segment of the training data, the one or more tensor train layers including a last layer in the neural network that receives a side input comprising segment information for the one or more segments.

8. The method of claim 7, further comprising:
accessing input data;
determining a segment associated with the input data, wherein the segment associated with the input data is a set of one or more common characteristics of the input data;
transforming the input data using one or more tensor train layers, based on the segment associated with the input data; and
generating output by applying the one or more tensor train layers to the transformed input data.

9. The method of claim 8, wherein the training includes training the neural network to predict a likelihood that a user associated with the input data will interact with a content item associated with the input data if the user is presented with the content item in a user interface of the online network.

10. The method of claim 9, wherein the likelihood that the user associated with the input data will interact is a likelihood that the user associated with the input data will click on the content item input data if the user is presented with the content item in the user interface of the online network.

11. The method of claim 7, wherein the converting the matrix includes:
crossing one or more categorical variables in the training data with the
training data to output a dense vector; and
passing the dense vector in a tensor train layer of the neural network designed to approximate the matrix using a bijection.

12. The method of claim 7, wherein the training data further comprises data about interactions of users with content items.

13. A system comprising:
means for accessing training data comprising information about one or more users of an online network and one or more content items of the online network;
means for obtaining one or more segments of the training data, wherein the one or more segments are each a set of one or more common characteristics of the training data; and
means for training a neural network by feeding the training data into the neural network, the neural network containing a plurality of fully-connected layers, at least one of the fully-connected layers being a tensor train layer designed to convert a matrix associated with the at least one of the fully connected layers into a tensor using tensor train decomposition, each of a plurality of dimensions of the tensor corresponding to a respective property used to define a different segment of the training data, the one or more tensor train layers including a last layer in the neural network that receives a side input comprising segment information for the one or more segments.

14. The system of claim 13, wherein the operations further comprise:
- accessing input data;
- determining a segment associated with the input data, wherein the segment associated with the input data is a set of one or more common characteristics of the input data;
- transforming the input data using one or more tensor train layers, based on the segment associated with the input data; and
- generating output by applying the one or more tensor train layers to the transformed input data.

15. The system of claim 14, wherein the training includes training the neural network to predict a likelihood that a user associated with the input data will interact with a content item associated with the input data if the user is presented with the content item in a user interface of the online network.

16. The system of claim 15, wherein the likelihood that the user associated with the input data will interact is a likelihood that the user associated with the input data will click on the content item if the user is presented with the content item in the user interface of the online network.

17. The system of claim 13, wherein the converting the matrix includes:
- crossing one or more categorical variables in the training data with the training data to output a dense vector; and
- passing the dense vector in a tensor train layer of the neural network designed to approximate the matrix using a bijection.

* * * * *